(12) United States Patent
Nunes et al.

(10) Patent No.: US 10,528,753 B2
(45) Date of Patent: Jan. 7, 2020

(54) PORTABLE DOCUMENT FORMAT FILE CUSTOM FIELD

(71) Applicant: Hewlett-Packard Development Company, L.P., Houston, TX (US)

(72) Inventors: Veronica Nunes, Porto Alegre (BR); Lonnie D Mandigo, Corvallis, OR (US); Rafael Brito Di Bernardo, Recife (BR); Luiz Gustavo Magalhaes Borba Carvalho, Recife (BR); Ioram Schechtman Sette, Recife (BR); Alvaro Maia, Pernambuco (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 206 days.

(21) Appl. No.: 15/558,948

(22) PCT Filed: Jun. 26, 2015

(86) PCT No.: PCT/US2015/038144
§ 371 (c)(1),
(2) Date: Sep. 15, 2017

(87) PCT Pub. No.: WO2016/209292
PCT Pub. Date: Dec. 29, 2016

(65) Prior Publication Data
US 2018/0082074 A1    Mar. 22, 2018

(51) Int. Cl.
*G06F 21/00* (2013.01)
*G06F 21/62* (2013.01)
*G06F 21/60* (2013.01)
*G06F 21/10* (2013.01)
(Continued)

(52) U.S. Cl.
CPC .......... *G06F 21/6218* (2013.01); *G06F 21/10* (2013.01); *G06F 21/608* (2013.01);
(Continued)

(58) Field of Classification Search
CPC ............. G06F 21/6218; G06F 21/6227; G06F 21/6209; G06F 21/10; G06F 21/6245;
(Continued)

(56) References Cited

U.S. PATENT DOCUMENTS 7,496,767 B2    2/2009  Evans
7,840,487 B2    11/2010 Hatano et al.
(Continued)

FOREIGN PATENT DOCUMENTS

WO    WO-2015/006798 A1    1/2015

OTHER PUBLICATIONS

"PDF Postman", < https://www.encryptomatic.com/pdfpostman/ > 2015—3 pages.

*Primary Examiner* — Jeffrey C Pwu
*Assistant Examiner* — William A Corum, Jr.
(74) *Attorney, Agent, or Firm* — HP Inc. Patent Department

(57) ABSTRACT

Examples include assembly of a portable document format file including encrypted content, unencrypted content, and/or alternative content. In an example, metadata, data block(s), and a content map are signed and stored in, or assembled into, a custom field or fields of the portable document format file. The metadata, data block(s), and content map are encrypted and assembled into a custom field or fields of the portable document format file with an encrypted key or keys. Unencrypted and/or alternative content may also be stored in the assembled portable document format file.

16 Claims, 5 Drawing Sheets

(51) Int. Cl.
*H04L 9/32* (2006.01)
*G06F 21/64* (2013.01)
*G06Q 30/02* (2012.01)

(52) U.S. Cl.
CPC .......... *H04L 9/3242* (2013.01); *H04L 9/3263* (2013.01); *G06F 21/64* (2013.01); *G06F 2221/2107* (2013.01); *G06Q 30/0277* (2013.01)

(58) Field of Classification Search
CPC ............... G06F 21/608; G06F 21/64; G06F 2221/2107; H04L 9/3263; H04L 9/3242; G06Q 30/0277
See application file for complete search history.

(56) References Cited

U.S. PATENT DOCUMENTS

| | | |
|---|---|---|
| 9,275,233 B1* | 3/2016 | Lu .......................... G06F 21/60 |
| 2004/0117320 A1 | 6/2004 | Morioka et al. |
| 2004/0139327 A1* | 7/2004 | Brown .................... G06F 21/34 |
| | | 713/176 |
| 2005/0138382 A1* | 6/2005 | Hougaard ............... G06Q 10/10 |
| | | 713/176 |
| 2006/0075228 A1* | 4/2006 | Black .................. H04L 63/0428 |
| | | 713/167 |
| 2009/0106549 A1 | 4/2009 | Mohamed |
| 2011/0246776 A1 | 10/2011 | Deaver et al. |
| 2012/0036365 A1 | 2/2012 | Kyslov et al. |
| 2012/0131351 A1* | 5/2012 | Balinsky ............... H04L 9/0825 |
| | | 713/189 |
| 2012/0159296 A1* | 6/2012 | Rebstock ............... G06Q 10/00 |
| | | 715/205 |
| 2012/0185701 A1* | 7/2012 | Balinsky ............. G06F 21/6209 |
| | | 713/193 |
| 2013/0041873 A1* | 2/2013 | Laursen ............. G06F 16/1827 |
| | | 707/705 |
| 2014/0108805 A1 | 4/2014 | Smith et al. |
| 2014/0115328 A1 | 4/2014 | Allen et al. |
| 2017/0132186 A1* | 5/2017 | Plummer ................. G09C 1/00 |

* cited by examiner

PORTABLE DOCUMENT FORMAT FILE CUSTOM FIELD

BACKGROUND

Computing systems, devices, and electronic components in general may utilize content in the form of digital files. A computer system may create files, store files, or receive files that may contain data that is designated as either non-confidential or confidential, or otherwise sensitive or not for public distribution. Data within a file may be encrypted, and may be stored in a format or file wrapper that is readable across various systems, devices, components, platforms, operating systems, and/or software applications.

BRIEF DESCRIPTION OF THE DRAWINGS

The following detailed description references the drawings, wherein.

DETAILED DESCRIPTION

Figure 1:
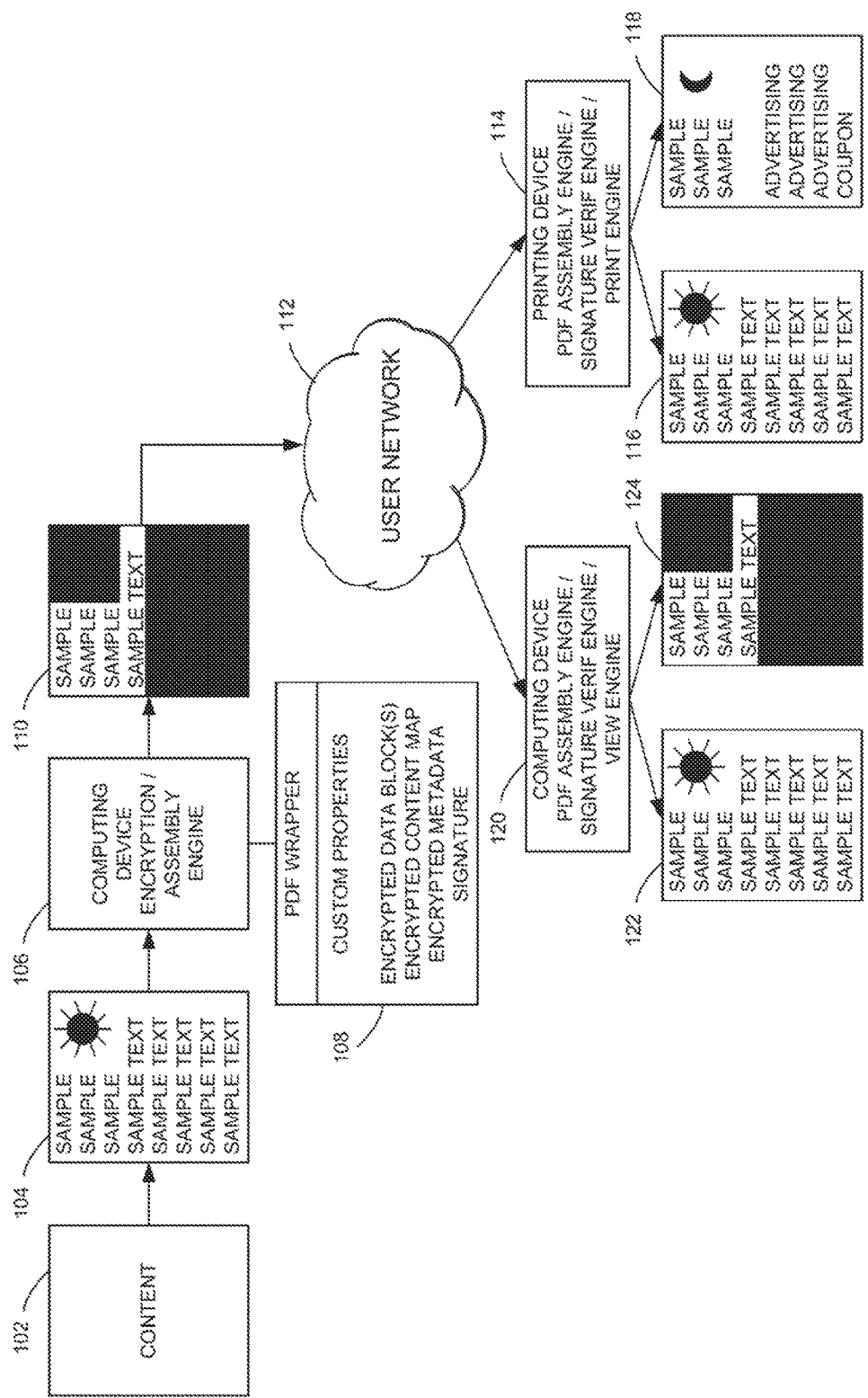
FIG. 1 is a block diagram of a system to assemble a portable document format file with encrypted and unencrypted content, according to an example.

Various examples described below provide for assembly of a portable document format file, or other file formats, including encrypted content, unencrypted content, and/or alternative content into a partially-encrypted portable document format wrapper or template, or other format wrapper or template. In examples, metadata, data block(s), and a content map are signed and stored in, or assembled into, a custom field or fields of the portable document format file, and the metadata, data block(s), and content map are encrypted and assembled into a custom field or fields of the portable document format file with an encrypted key or keys, without sharing a user's private key.

Unencrypted and/or alternative content may also be stored in the assembled portable document format file. Various examples described below also provide for disassembly and reassembly of the portable document format file based on a signature verification to prevent and/or detect document manipulation of the file.

In general, users may wish to store non-confidential data or content (hereinafter "content") in unencrypted form along with confidential content in encrypted form, as appropriate, in a digital or electronic file format that may be readable across various systems, devices, components, platforms, operating systems, and/or software applications (hereinafter "platforms"). In one example, a portable document format ("PDF") file may be used. A PDF file may include a wrapper or template that is readable by a program such as a viewing program, editing program, or printing program, provided that the PDF wrapper or template conforms to the expected or pre-defined wrapper or template configuration or arrangement. Other file wrappers, templates, or formats may also be utilized.

In an example where a PDF includes both confidential and non-confidential content, a user may wish to encrypt only part of the content to minimize the file size of the PDF, and also to reduce the computational demands of assembling or encrypting the PDF file, or decrypting and/or disassembling or reassembling the PDF file. A user may also wish to include security mechanisms which provide for greater security than, for example, password protection alone, or greater than symmetric algorithms for encryption that may be vulnerable to, for example, key search techniques.

Similarly, a user may wish to avoid the risk of a PDF being modified in transmission, which may not be preventable or detectable using certificate-based encryption via a public key infrastructure, and may wish to avoid the risk of another party encrypting a new file with the same public key if a content signature is not provided. In such examples, however, the user may wish to retain compatibility with the PDF wrapper or template, such that the encrypted or partially-encrypted PDF file is still readable by existing PDF programs.

A user may also wish to include alternative content that may be displayed. e.g., in place of encrypted content that is not decrypted, in the event that a signature verification or other authentication protocol fails when the PDF file is accessed. As above, in such examples, the user may wish to retain computability with the PDF wrapper or template.

Referring now to the drawings, FIG. 1 is a block diagram of a system to assemble a portable document format file with encrypted and unencrypted content, according to an example. The assembly of a PDF file in FIG. 1 retains compatibility of the PDF while providing for increased security and the ability to store unencrypted content, encrypted content and/or alternative content in a single PDF. As shown in FIG. 1, alternative content may also be stored in a PDF, which may be displayed in place of encrypted content in the event that a signature verification or other authentication process fails.

In the example of FIG. 1, a content provider or providers 102 may generate, create, or otherwise provide content such as text, images, documents, content parts, metadata, or other content or files. Content stored on content provider 102 may be in any format or formats, including combinations of formats, as shown in combined content file 104. Content on content provider 102 may contain public, private, non-confidential, or confidential data, or combinations or varying levels thereof. In addition to the primary content assembled into a PDF, content provider 102 may also provide alternative content, as discussed below in more detail, such as content that may replace other content in the event that a signature verification process or other authentication process fails when attempting to access the PDF.

Content provided by content provider 102 may be assembled into a format that is readable across various platforms. For example, content may be assembled into a PDF file that may follow or conform to a particular standard. In some examples, the PDF file may contain content and/or metadata, as well as custom fields or custom properties (hereinafter "custom fields") that may allow for custom values or data to be set or stored within the PDF, and with the PDF remaining readable across various platforms. For example, the custom fields may store encrypted data blocks, encrypted content maps, encrypted metadata, and/or digital signatures. Custom fields, which in some examples are not part of a PDF template or wrapper, may be added by using key-pair values such as for an encrypted metadata field with corresponding data, and may comprise a unique name and a unique value not used elsewhere in the PDF file.

In some examples, the content assembled into a PDF file, such as PDF 110, may comprise both unencrypted content and encrypted content. Unencrypted content may represent non-confidential data, while encrypted content may represent confidential content.

In the example of FIG. 1, system 100 comprises a computing device 106 at least partially implementing system 100, including but not limited to the encryption and assembly engine shown in computing device 106. Computing device 106 may include a processing resource and a machine-readable storage medium comprising (e.g., encoded with) instructions executable by the processing resource, as discussed below in more detail with respect to FIGS. 4 and 5. In some examples, the instructions may be implemented as engines comprising any combination of hardware and programming to implement the functionalities of the engines, as described below.

In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement the engines of system 106. In some examples, a plurality of machine-readable storage media and/or processing resources may be used.

As used herein, a "computing device" may be a server, blade enclosure, desktop computer, laptop (or notebook) computer, workstation, tablet computer, mobile phone, smart device, or any other processing device or equipment including a processing resource. In examples described herein, a processing resource may include, for example, one processor or multiple processors included in a single computing device or distributed across multiple computing devices.

Computing device 106 may include instructions to assemble encrypted and/or unencrypted content info a PDF file, including custom fields, as discussed below in more detail with respect to FIGS. 2 and 4. Computing device 106 may also include instructions to push a PDF file to, for example, a network 112, or to receive a pull request from another device, e.g., computing device 120 or printing device 114, through network 112 or other network connection.

Network 112 may be a local network, private network, public network, or other wired or wireless communications network accessible by a user or users. As used herein, a network or computer network may include, for example, a local area network (LAN), a wireless local area network (WLAN), a virtual private network (VPN), the Internet or the like, or a combination thereof. In some examples, a computer network may include a telephone network (e.g., a cellular telephone network). In examples described herein, one or more devices that communicate on network 112 may include a network interface device that may be a hardware device to communicate over at least one computer network. In some examples, a network interface may be a network interface card (NIC) or the like installed on or coupled to, for example, computing device 106, computing device 120, and/or printing device 114.

In the example of FIG. 1, a computing device 120 and/or printing device 114 at least partially implementing system 100 may communicate over network 112 via, e.g., a network interface device. As discussed above with respect to computing device 106, computing device 120 and/or printing device 114 may include a processing resource and a machine-readable storage medium comprising (e.g., encoded with) instructions executable by the processing resource, as discussed below in more detail with respect to FIGS. 4 and 5. In some examples, the instructions may be implemented as engines comprising any combination of hardware and programming to implement the functionalities of the engines, as described below.

As used herein, a "printing device" may be a printer, laser printer, inkjet printer, thermal printer, multifunction printer, or any other device or equipment including a processing resource and parts for printing to media.

Computing device 120 and/or printing device 114 may include instructions to disassemble and/or assemble/re-assemble encrypted and/or unencrypted content from a PDF file, including from custom fields within the PDF file, as discussed below in more detail with respect to FIGS. 3 and 5. Computing device 120 and/or printing device 114 may also include instructions to pull a PDF file from, for example, a network 112, such as from computing device 106 or other device capable of creating, storing, or sending a file to another device.

Computing device 120 and/or printing device 114 may display, view, print, or otherwise output a file such as a PDF file. In the example of computing device 120, a PDF may be displayed on a screen, display, or other visual output device. As shown in the examples of PDF 122 and 124, a PDF may be output with an of the PDF content visible, as in PDF 122, or with certain content redacted or otherwise unviewable as in PDF 124. In the example of a printing device 114, a PDF may be printed to media or otherwise output from a printing device. As shown in the examples of PDF 116 and 118, a PDF may be output with al of the PDF content visible, as in PDF 116, or with certain alternative content in the place of other content, as shown in PDF 118. The various example PDF file outputs and combinations of content shown in PDFs 116, 118, 122, and 124 may be output by either of computing device 120 or printing device 114.

Alternative content, as discussed herein, may be any content that is generally not considered confidential, or of a high level of confidentiality, such that encryption of the data would be desired. In some examples, alternative content may be advertising, coupons, and/or promotional material. As discussed below in more detail, alternative content may take the place of other content, such as encrypted content, in the event that a signature cannot be verified or in the event that another authentication type fails upon accessing a PDF. In some examples, alternative content may also be encrypted.

Figure 2:
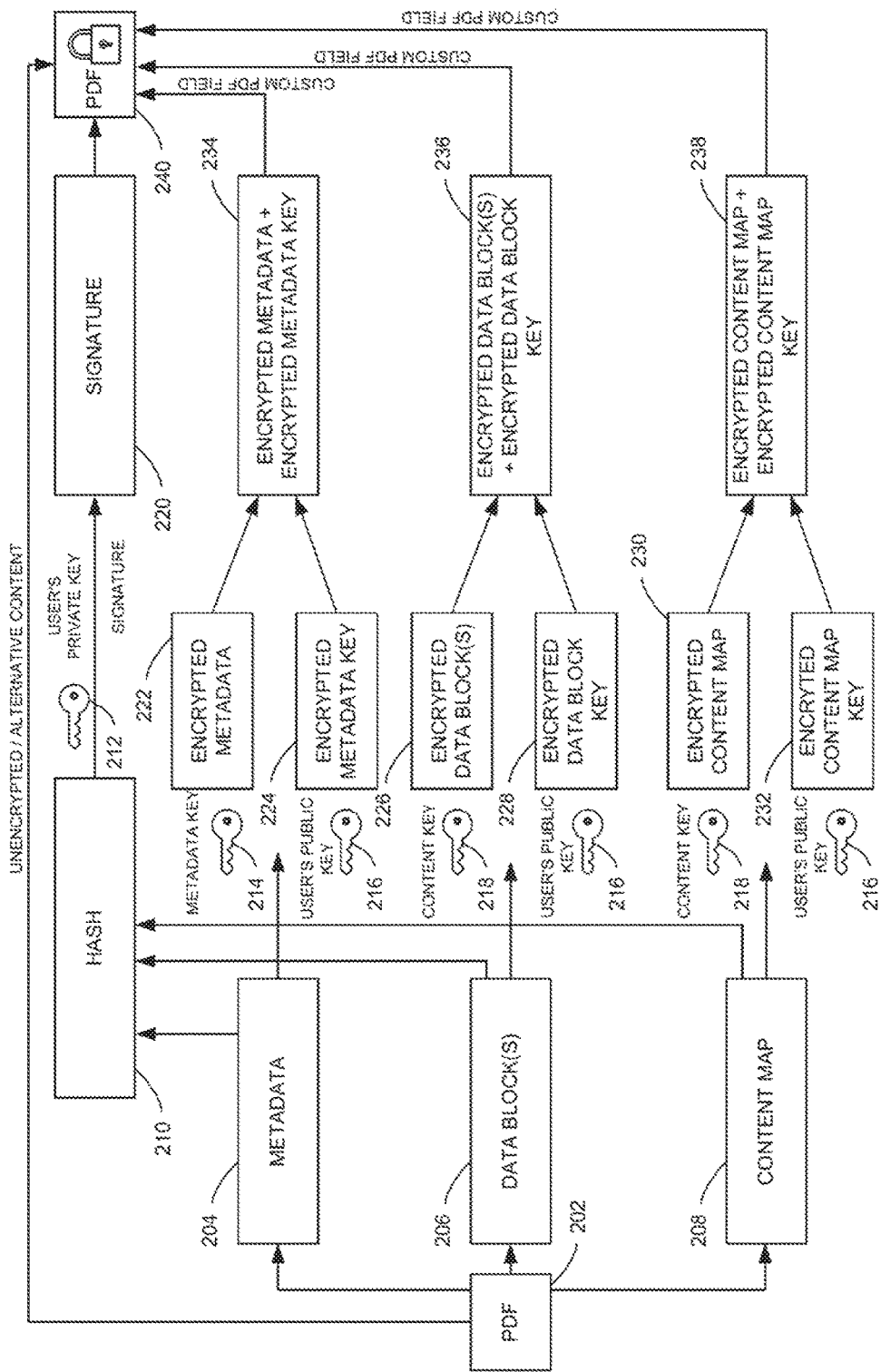
FIG. 2 is a flowchart of assembling a portable document format file with encrypted and unencrypted content, according to an example.

FIG. 2 is a flowchart of assembling a portable document format file with encrypted and unencrypted content, according to an example.

In the example of FIG. 2. PDF 202 may be an assembled or unassembled PDF, or content parts received from, for example, content provider 102 of FIG. 1. An encryption or assembly engine, such as encryption and assembly engine 106 may fetch and sign various parts of the content. For example, metadata 204, data blocks 206, and a content map 208 may be signed and stored as a hash. e.g., hash 210. In some examples, the hash may be signed with a user's private key, e.g., private key 212. The resulting signature may then be stored in an assembled PDF, e.g., PDF 240, or in a custom field of the assembled PDF. Various signature techniques or cryptographic hash functions may be used, such as the Secure Hash Algorithm ("SHA"), at varying hash values, e.g., SHA-256. The signature, in some examples, may be encoded. e.g., in BASE64 or another encoding scheme.

The metadata 204, data blocks 206, and content map 208 may also be encrypted, either following signature of the content or in parallel, as encrypted metadata 222, encrypted data blocks 226, and encrypted content map 230. In some examples, the metadata may be encrypted with a metadata key 214, while the data blocks and content map may be encrypted with a content key or keys 218, which may be the same or different keys. Various encryption techniques such as Advanced Encryption Standard ("AES") may be used at varying bit or key sizes, e.g., AES-128. In an example, the AES key may be a random key instead of a user's private key, to reduce the vulnerability of key search attacks and to minimize the burden of key distribution.

The keys used to encrypt the metadata, data blocks, and content map may also be encrypted using, for example, a user's public key 216, with the encrypted key or keys appended to the underlying data, e.g., as shown in blocks 234, 236, and 238. In some examples, the resulting data bytes may be encoded in, e.g., BASE64, or another encoding scheme. In some examples, the encrypted metadata key, data block key, and content map key may be stored in the assembled PDF 240, or in custom PDF fields within the assembled PDF 240.

Unencrypted and/or alternative content may also be stored in PDF 240. As discussed above, unencrypted content may be content that is public or does not carry a designation of confidentiality, and which may be stored in unencrypted form to, for example, reduce the size or computational demands of the PDF. Alternative content may be content that may replace other content in the event that a signature verification process or other authentication process fails when attempting to open the PDF. PDF file 240 may also be password protected or otherwise secured with an authentication protocol.

Figure 3:
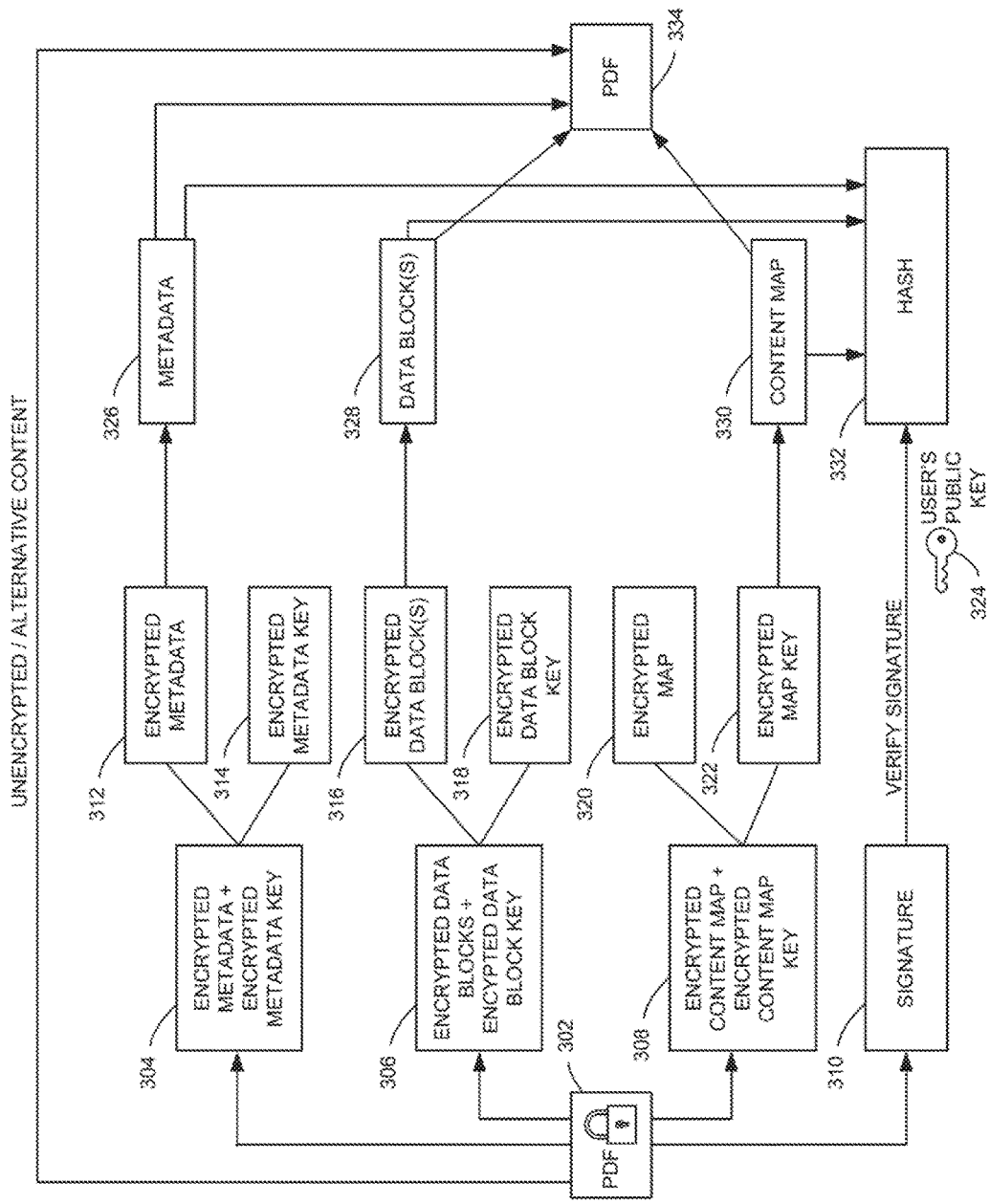
FIG. 3 is a flowchart of disassembling and reassembling a portable document format file with encrypted and unencrypted content, according to an example.

FIG. 3 is a flowchart of disassembling a portable document format ille with encrypted and unencrypted content, according to an example.

In the example of FIG. 3, PDF 302 may be an assembled PDF received from, for example, an encryption and assembly engine 106 of FIG. 1, or generally a device capable of file storage and/or delivery though. e.g., network 112 to, e.g., a computing device 120 or printing device 114.

A PDF disassembly or reassembly engine (or generally a "PDF assembly engine") such as an engine in printing device 114 and/or computing device 120 may fetch or extract (or "disassemble") from PDF 302 a signature, e.g., signature 310, either from PDF 302 generally or from within a custom field of PDF 302. The signature may be verified using, e.g., any of the signature techniques discussed above such as SHA-256. A user's public key, e.g., key 324, may be used to verify the signature. If the PDF file is password protected, a password may also be required prior to or after verification of a signature.

An unencrypted content pert may also be fetched from PDF 302. The unencrypted content part may be assembled or re-assembled into a PDF, e.g., PDF 334. In the event that the signature discussed above. e.g., signature 310, is not verified, alternative content may also be fetched and assembled into PDF 334, e.g., in place of decrypted content, as discussed in more detail below.

In the event that signature 310 is verified, encrypted metadata 304, encrypted data blocks 306, and encrypted content map 308 may be fetched and decrypted. In some examples, a key or keys appended to the encrypted metadata 304, encrypted data blocks 306, and encrypted content map 308 may be extracted to be used in the decryption, or a user's private key may be used. As discussed above, various encryption and decryption techniques such as AES-128 may be used. The decrypted metadata 324, data blocks 326, and content map 328 may be stored or reassembled into PDF 334, along with any unencrypted content and/or alternative content. As shown in FIG. 1, the assembled or reassembled PDF 334 may be displayed or printed with unencrypted content, encrypted content, and/or alternative content, or combinations thereof.

Figure 4:
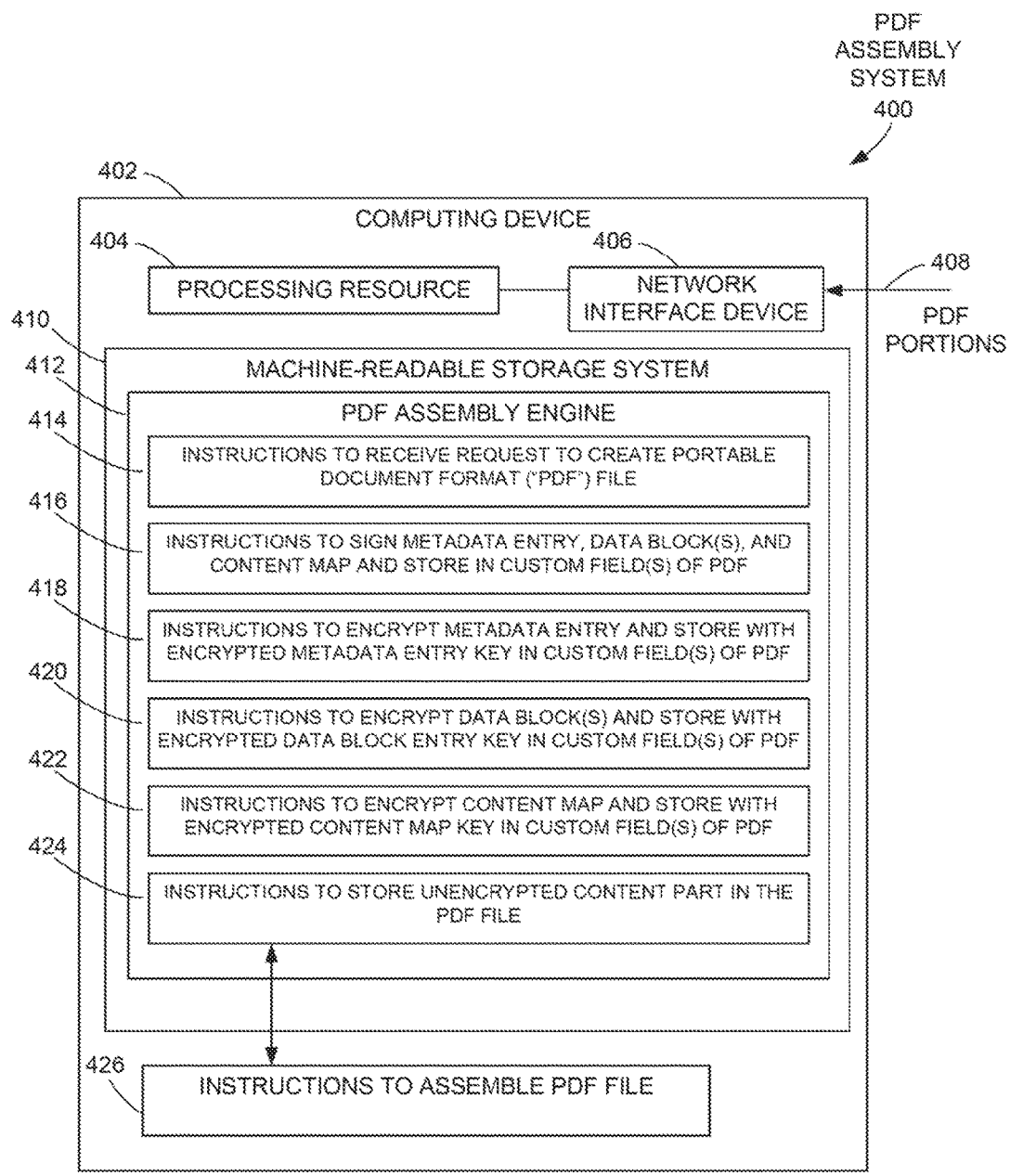
FIG. 4 is a block diagram of a system to assemble a portable document format file with encrypted and unencrypted content, according to an example.

FIG. 4 is a block diagram of a system to assemble a portable document format file with encrypted and unencrypted content, according to an example.

The computing system 402 of FIG. 4 may comprise a processing resource or processor 404. As used herein, a processing resource may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. Processing resource 404 may fetch, decode, and execute instructions, e.g., instructions 414-424, stored on storage medium 410 to perform the functionalities described herein. In other examples, the functionalities of any of the instructions of storage medium 410 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution.

In some examples, instructions 414-424 may be part of an installation package that, when installed, may be executed by processing resource 404 to implement the functionalities described herein in relation to instructions 414-424. In such examples, storage medium 410 may be a portable medium, such as a CD, DVD, or flash drive, or a memory maintained by a server from which the installation package can be downloaded and installed. In other examples, instructions 414-424 may be part of an application, applications, or component(s) already installed on a computing device 120 or printing device 114 including processing resource 404. In such examples, the storage medium 410 may include memory such as a hard drive, solid state drive, or the like.

System 400 may also include a network interface device 406, as described above, which may receive content parts or portions of content parts for assembly into a PDF, e.g., via a network. System 400 may also include persistent storage and/or memory. In some examples, persistent storage may be implemented by at least one non-volatile machine-readable storage medium, as described herein, and may be memory utilized by system 400 for persistently assembling PDF files. Memory may be implemented by at least one machine-readable storage medium, as described herein, and may be volatile storage utilized by system 400 for performing the PDF assembly processes as described herein, for example. Storage 410 may be separate from a memory. In some examples, a memory may temporarily store data portions while performing processing operations on them, such as the PDF assembly as described herein.

The instructions on machine-readable storage system 410 may comprise a PDF assembly engine 412 for assembling content parts, e.g., from content providers 102 as described in the example of FIG. 1. In block 414, the instructions may receive a request to a create a PDF. The request may be received from a user, a process, an application, a device, or another process.

In block 416, the instructions may sign a metadata entry or entries, a data block or blocks, and a content map or maps using the signature techniques described above. The signed metadata entries, data blocks, and content maps may be stored in the PDF or in custom fields of the PDF.

In block 418, the instructions may encrypt the metadata entry and store the encrypted metadata entry with an encrypted version of the metadata entry key used to encrypt the metadata entry. In some examples, the encrypted metadata entry key may be appended to the encrypted metadata entry, and may be stored in the PDF or a custom field of the PDF.

In block 420, the instructions may encrypt the data blocks and store the encrypted data blocks with an encrypted version of the data block key used to encrypt the data blocks. In some examples, the encrypted data block key may be appended to the encrypted data block, and may be stored in the PDF or a custom field of the PDF.

In block 422, the instructions may encrypt the content map and store the encrypted content map with an encrypted version of the content map key used to encrypt the content map. In some examples, the encrypted content map key may be appended to the encrypted content map, and may be stored in the PDF or a custom field of the PDF.

In block 424, the instructions may store an unencrypted content part in the PDF. In some examples, the instructions may also store, or alternatively store, an alternative content part such as the alternative content discussed above.

In block 426, the instructions may assemble the PDF file. The assembly of the PDF file may include assembling the file such that it conforms to a particular wrapper or template expected of a PDF file so that the ile is readable across various platforms.

Although the instructions of FIG. 4 show a specific order of performance of certain functionalities, the instructions of FIG. 4 are not limited to that order. For example, the functionalities shown in succession may be performed in a different order, may be executed concurrently or with partial concurrence, or a combination thereof.

Figure 5:
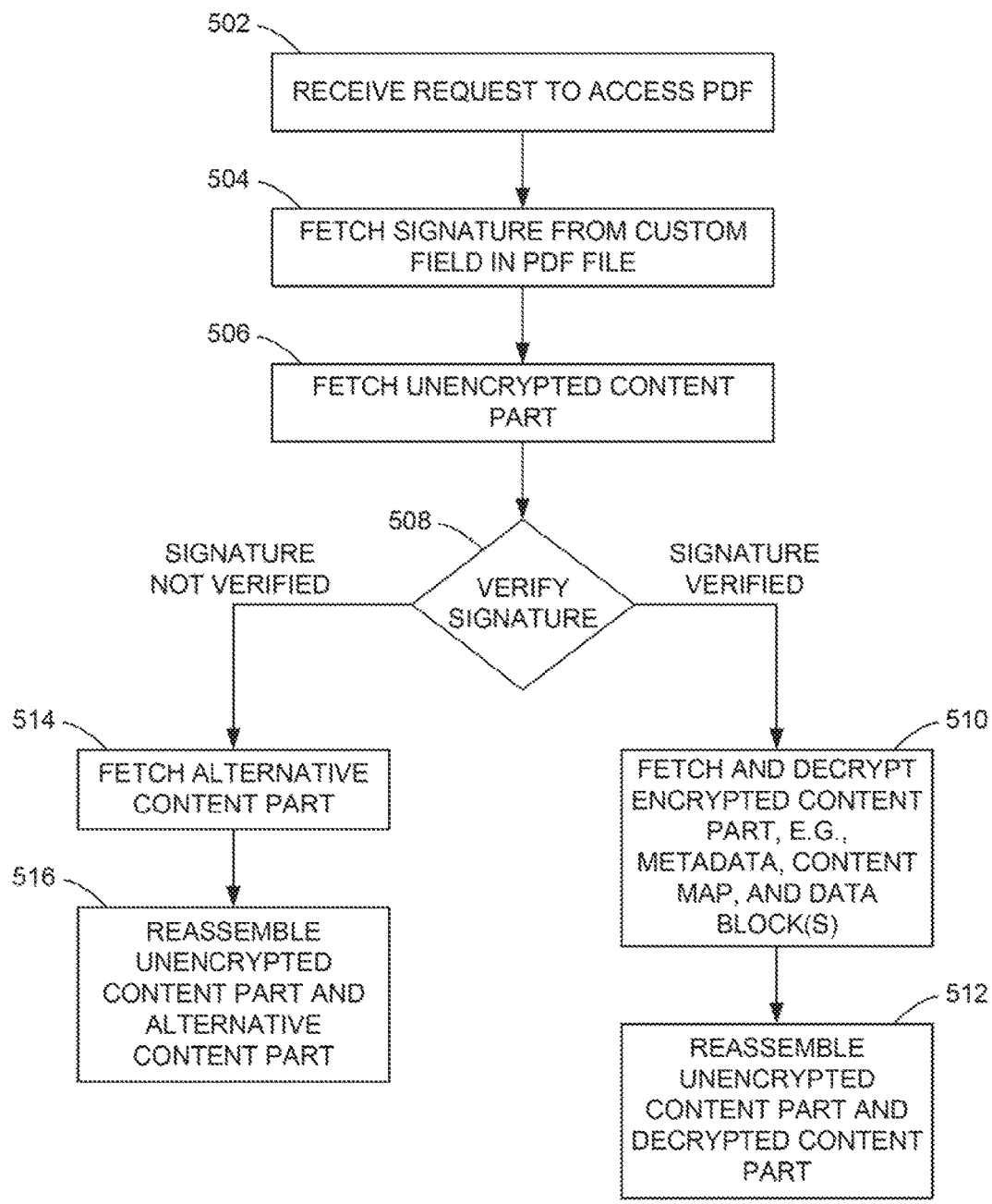
FIG. 5 is a flowchart of a method to access a portable document format file with encrypted and unencrypted content, according to an example.

FIG. 5 is a flowchart of a method to access a portable document format file with encrypted and unencrypted content, according to an example.

In the example of FIG. 5, in block 502, a request to access a PDF may be received. The request may be received from a user, a process, an application, a device, or another process. The PDF may be stored locally on a device, or may be accessed remotely, e.g., from a file server.

In block 504, a signature stored in a PDF or in a custom field of a PDF file is fetched. The signature may be, for example, the signature 310 shown in FIG. 3.

In block 506, an unencrypted content part, such as the unencrypted content shown in FIG. 3, may be fetched. In some examples, there may be no unencrypted content stored, in which case block 506 may be bypassed.

In block 508, a signature, e.g., signature 310, may be verified using any signature verification technique. In the event that the signature is verified, flow may proceed to block 510.

In block 510, an encrypted content part. e.g., a content part comprising metadata 304, data block(s) 306, and/or content map 308 may be fetched. The metadata, data blocks, and/or content map may then be decrypted using any decryption technique, e.g., AES-128, resulting in decrypted metadata 326, decrypted data blocks 328, and decrypted content map 330. In some examples, a key or keys appended to the encrypted metadata 304, encrypted data blocks 306, and encrypted content map 308 may be extracted to be used in the decryption, or a user's private key may be used.

In block 512, the unencrypted content part fetched in block 506, if any, and the decrypted content parts including metadata 326, data block(s) 328, and/or content map 330 may be reassembled into the PDF, or into a new PDF wrapper, e.g., PDF 334 of FIG. 3. The PDF 334 may then be printed or viewed. e.g., on computing device 120 or printing device 114, with both the unencrypted content and the decrypted content viewable or printable.

In the event that the signature is not verified in block 508, flow may proceed to block 514. In block 514, an alternative content part or parts may be fetched, as described above, such as advertising, coupons, or other alternative content.

In block 516, the unencrypted content part fetched in block 506 may be reassembled into the PDF, or into a new PDF wrapper. e.g., PDF 334 of FIG. 3, along with the alternative content. The PDF 334 may then be printed or viewed. e.g., on computing device 120 or printing device 114, with both the unencrypted content and the alternative content viewable.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof.

All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. An article comprising at least one non-transitory machine-readable storage medium storing instructions executable by a processing resource of a file encryption system to cause the processing resource to:
   receive a request to create a portable document format (PDF) file;
   create a custom field in the PDF file to store encrypted data;
   sign a metadata entry, a data block, and a content map with a first key to generate a signature for the PDF file and store the signature as part of the encrypted data in the custom field of the PDF file;

encrypt the metadata entry with a metadata entry key, encrypt the metadata entry key with a second key, and store the encrypted metadata entry with the encrypted metadata entry key as part of the encrypted data in the custom field of the PDF file;

encrypt the data block with a data block key, encrypt the data block key with the second key, and store the encrypted data block with the encrypted data block key as part of the encrypted data in the custom field of the PDF file; and store an unencrypted content part in an area of the PDF file that is not the custom field of the PDF file.

2. The article of claim 1, wherein the instructions are further executable to cause the processing resource to store an alternative content part in the area of the PDF file that is not the custom field of the PDF file, wherein the alternative content part is content to be displayed when an authentication process of the PDF file fails.

3. The article of claim 1, wherein the instructions are further executable to cause the processing resource to assemble the PDF file.

4. The article of claim 1, wherein the signed metadata, data block, and content map are stored as a hash.

5. The article of claim 1, wherein the instructions are executable to cause the processing resource to:
encrypt the content map with a content map key, encrypt the content map key with the second key, and store the encrypted content map with the encrypted content map key in the custom field of the PDF file.

6. A method comprising:
receiving a request to access a portable document format (PDF) file including an encrypted content part and an unencrypted content part;

fetching, on a processor, a signature of the PDF file stored in a custom field of the PDF file and fetching, on the processor, unencrypted content stored in an area that is not the custom field of the PDF file;

determining, on the processor, whether the signature stored in the custom field of the PDF file is verified;

in response to a determination that the signature is verified, fetching the encrypted content part and a content part key from the custom field of the PDF file, decrypting the encrypted content part using the content part key, and assembling the decrypted content part with the unencrypted content part; and in response to a determination that the signature is not verified, fetching an alternative content part from the area that is not the custom field of the PDF file and assembling the alternative content part with the unencrypted content part, wherein the alternative content part is content to be displayed when an authentication process, including a verification process of the signature, of the PDF file fails.

7. The method of claim 6, wherein the encrypted content part comprises metadata, a content map, and a data block.

8. The method of claim 6, wherein the content part key fetched from the custom field of the PDF file is an encrypted content part key, and is decrypted by a public key.

9. The method of claim 6, wherein the alternative content part is selected from one of advertising, coupons, and promotional material.

10. A cloud print system comprising:
a processing resource; and
a non-transitory computer readable storage medium storing instructions that when executed by the processing resource cause the processing resource to:
extract a signature of a portable document format (PDF) file stored in a custom field of the PDF file, an encrypted content part and a content part key stored in the custom field of the PDF file, and an unencrypted content part stored in an area that is not the custom field of the PDF file;

verify the signature of the PDF file;

in response to a determination that the signature is verified, decrypt the encrypted content part using the content part key, and assemble the decrypted content part with the unencrypted content part for printing; and in response to a determination that the signature is not verified, extract an alternative content part from the area that is not the custom field of the PDF file and assemble the alternative content part with the unencrypted content part for printing, wherein the alternative content part is content to be printed when an authentication process, including a verification process of the signature, of the PDF file fails.

11. The system of claim 10, wherein the instructions are executable to cause the processing resource to render a printer to print the assembled decrypted content part and unencrypted content part.

12. The system of claim 10, wherein the instructions are executable to cause the processing resource to replace the encrypted content part with a redacted content part in response to the determination that the signature is not verified.

13. The system of claim 10, wherein the content part key extracted from the custom field of the PDF file is an encrypted content part key, and is decrypted by a public key.

14. The system of claim 10, wherein the alternative content part is an advertisement.

15. The system of claim 10, wherein the custom field of the PDF file is created by a content provider.

16. The article of claim 1, wherein the first key is a private key, and the second key is a public key.

* * * * *